United States Patent
Deng

(10) Patent No.: US 9,942,383 B2
(45) Date of Patent: *Apr. 10, 2018

(54) METHOD AND APPARATUS FOR PROCESSING CONTACT INFORMATION USING A WIRELESS TERMINAL

(71) Applicant: Huawei Device (Dongguan) Co., Ltd., Dongguan (CN)

(72) Inventor: Junjie Deng, Shenzhen (CN)

(73) Assignee: Huawei Device (Dongguan) Co., Ltd., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/599,586

(22) Filed: May 19, 2017

(65) Prior Publication Data

US 2017/0257476 A1 Sep. 7, 2017

Related U.S. Application Data

(63) Continuation of application No. 14/884,265, filed on Oct. 15, 2015, now Pat. No. 9,667,771, which is a (Continued)

(30) Foreign Application Priority Data

Aug. 19, 2009 (CN) .......................... 2009 1 01664770

(51) Int. Cl.
*H04M 1/725* (2006.01)
*H04M 1/2745* (2006.01)
(Continued)

(52) U.S. Cl.
CPC .... *H04M 1/72547* (2013.01); *G06Q 30/0641* (2013.01); *H04L 51/28* (2013.01);
(Continued)

(58) Field of Classification Search
CPC ........... H04W 4/12; H04W 4/14; H04W 4/18; H04W 52/0267; H04W 52/027
(Continued)

(56) References Cited

U.S. PATENT DOCUMENTS 7,340,518 B1 3/2008 Jenkins
7,395,319 B2 7/2008 Harris et al.
(Continued)

FOREIGN PATENT DOCUMENTS

CN 1779705 A 5/2006
CN 101188827 A 5/2008
(Continued)

*Primary Examiner* — Jean Gelin
(74) *Attorney, Agent, or Firm* — Huawei Device (Dongguan) Co., Ltd.

(57) ABSTRACT

A method and apparatus for processing contact information, the method comprising: displaying a list of contacts on a display of a wireless terminal; determining a first contact from the list of contacts in response to a selection by a user; obtaining a web log address and an online shop address of the first contact; obtaining, from a network service, a first content corresponding to the web log address and the online shop address of the first contact; and displaying the first content on a first area of the display, the first content being dynamically updated.

23 Claims, 3 Drawing Sheets

Related U.S. Application Data continuation of application No. 14/519,420, filed on Oct. 21, 2014, now Pat. No. 9,191,487, which is a continuation of application No. 12/856,150, filed on Aug. 13, 2010, now Pat. No. 8,892,167.

(51) Int. Cl.
*H04M 1/57* (2006.01)
*H04L 12/58* (2006.01)
*G06Q 30/06* (2012.01)
*H04W 4/16* (2009.01)
*H04W 88/02* (2009.01)
*H04W 4/12* (2009.01)

(52) U.S. Cl.
CPC ..... *H04M 1/274516* (2013.01); *H04M 1/575* (2013.01); *H04M 1/72552* (2013.01); *H04M 1/72561* (2013.01); *H04W 4/16* (2013.01); *H04L 51/38* (2013.01); *H04M 1/27455* (2013.01); *H04M 1/576* (2013.01); *H04M 2250/60* (2013.01); *H04W 4/12* (2013.01); *H04W 88/02* (2013.01)

(58) Field of Classification Search
USPC ...... 455/414.1, 414.2, 415, 440, 456.1, 466, 455/566, 418, 445, 414.4; 345/173, 177; 715/769, 835; 370/310, 352; 709/217, 709/218, 219
See application file for complete search history.

(56) References Cited

U.S. PATENT DOCUMENTS

| | | | |
|---|---|---|---|
| 8,000,726 B2 | 8/2011 | Altman et al. | |
| 8,089,943 B2 | 1/2012 | Lim | |
| 8,095,119 B2 | 1/2012 | Sabotta et al. | |
| 8,106,856 B2 | 1/2012 | Matas et al. | |
| 8,106,887 B2 | 1/2012 | Park et al. | |
| 8,140,058 B2 | 3/2012 | Park | |
| 8,583,175 B2 | 11/2013 | Haitani et al. | |
| 8,600,446 B2 | 12/2013 | Chiang et al. | |
| 2003/0013483 A1 | 1/2003 | Ausems et al. | |
| 2004/0017376 A1 | 1/2004 | Tagliabue et al. | |
| 2004/0235520 A1 | 11/2004 | Cadiz et al. | |
| 2005/0289180 A1 | 12/2005 | Pabla et al. | |
| 2006/0135142 A1 | 6/2006 | Repka | |
| 2007/0054661 A1 | 3/2007 | Park et al. | |
| 2007/0150544 A1* | 6/2007 | Jachner | H04L 29/06027 709/207 |
| 2007/0168529 A1 | 7/2007 | Taylor et al. | |
| 2007/0249327 A1 | 10/2007 | Nurmi | |
| 2008/0085700 A1 | 4/2008 | Arora | |
| 2008/0133580 A1 | 6/2008 | Wanless et al. | |
| 2008/0234006 A1 | 9/2008 | Lee et al. | |
| 2009/0147771 A1 | 6/2009 | Seal et al. | |
| 2009/0157513 A1* | 6/2009 | Bonev | G06F 17/30029 705/14.69 |
| 2009/0163141 A1 | 6/2009 | Chae | |
| 2009/0239588 A1 | 9/2009 | Nam | |
| 2009/0305682 A1 | 12/2009 | Spalink | |
| 2010/0250685 A1 | 9/2010 | Kunz et al. | |
| 2010/0262928 A1* | 10/2010 | Abbott | G06F 3/04817 715/769 |
| 2011/0045850 A1 | 2/2011 | Deng | |
| 2011/0238758 A1 | 9/2011 | Liang et al. | |

FOREIGN PATENT DOCUMENTS

| | | |
|---|---|---|
| CN | 101197727 A | 6/2008 |
| CN | 201167395 Y | 12/2008 |
| CN | 101345941 A | 1/2009 |
| CN | 101425093 A | 5/2009 |
| CN | 101645856 A | 2/2010 |
| EP | 1239392 A2 | 9/2002 |
| WO | 2011/020415 A1 | 2/2011 |

* cited by examiner

METHOD AND APPARATUS FOR PROCESSING CONTACT INFORMATION USING A WIRELESS TERMINAL

CROSS-REFERENCE TO RELATED APPLICATIONS

This application is a continuation of U.S. patent application Ser. No. 14/884,265, filed on Oct. 15, 2015, which is a continuation of U.S. patent application Ser. No. 14/519,420, filed on Oct. 21, 2014, now U.S. Pat. No. 9,191,487, which is a continuation of U.S. patent application Ser. No. 12/856,150, filed on Aug. 13, 2010, now U.S. Pat. No. 8,892,167, which claims priority to Chinese Patent Application No. 200910166470.4, filed on Aug. 19, 2009. The aforementioned patent applications are hereby incorporated by reference in their entireties.

TECHNICAL FIELD

The present invention relates to communications technology, and in particular embodiments, to a method and apparatus for processing contact information using a wireless terminal.

BACKGROUND

With richer web content, the network has become one of the main ways for people to obtain information and express themselves. For example, people may write articles through a blog, upload and present photos in a web album, and update their personalized signature, feeling or image using QQ and MSN. (Tencent QQ, generally referred to as QQ, is a popular free instant messaging computer program in China; MSN (originally the Microsoft Network) is a collection of Internet sites and services provided by Microsoft.) Using services such as these, friends can know the current living state of the users according to such web information. In addition, people may operate an online shop at Taobao.com to sell commodities, so that other people may log in to the online shop to check for new commodities.

In the conventional art, when people want to know whether the QQ signature of a concerned contact is changed, they have to log in to QQ; when people want to check whether they receive an email from a concerned contact, they have to log in to the email box.

During the implementation of the present invention, the inventor finds at least the following problems in the conventional art. When people want to obtain information about concerned contacts, they have to use different ways, for example, logging in to the QQ or email box. Thus, this operation process is complicated and not real-time. Thus, there is a need to solve the problem of how to obtain information about concerned contacts easily and quickly.

SUMMARY OF THE INVENTION

Embodiments of the present invention provide a wireless terminal and a method for processing contact information performed by a wireless terminal.

In one embodiment of the present invention, there is provided a wireless terminal, including: a display; one or more processors; and a memory storing programming for execution by the one or more processors, the programming including instructions for: displaying a list of contacts on a display of the wireless terminal; determining a first contact from the list of contacts in response to a selection by a user; determining a second contact from the list of contacts in response to another selection by the user; obtaining a web log address and an online shop address of the first contact; obtaining another web log address and another online shop address of the second contact; obtaining, from a network service, a first content corresponding to the web log address and the online shop address of the first contact; obtaining, from the network service, a second content corresponding to the other web log address and the other online shop address of the second contact; displaying the first content on a first area of the display, the first content being dynamically updated; and displaying the second content on a second area of the display, the second content being dynamically updated, wherein the first area of the display is different from the second area of the display.

In another embodiment of the present invention, there is provided a method for processing contact information performed by a wireless terminal, the method including: displaying a list of contacts on a display of the wireless terminal; determining a first contact from the list of contacts in response to a selection by a user; obtaining a web log address and an online shop address of the first contact; obtaining, from a network service, a first content corresponding to the web log address and the online shop address of the first contact; and displaying the first content on a first area of the display, the first content being dynamically updated.

In yet another embodiment of the present invention, there is provided a wireless terminal, including: a display; one or more processors; and a memory storing programming for execution by the one or more processors, the programming including instructions for: displaying a list of contacts on a display of the wireless terminal; determining a first contact from the list of contacts in response to a selection by a user; obtaining a web log address and an online shop address of the first contact; obtaining, from a network service, a first content corresponding to the web log address and the online shop address of the first contact; and displaying the first content on a first area of the display, the first content being dynamically updated.

In yet another embodiment of the present invention, there is provided a non-transitory computer-readable storage medium storing programming for execution by one or more processors, the programming including instructions for: displaying a list of contacts on a display of the wireless terminal; determining a first contact from the list of contacts in response to a selection by a user; obtaining a web log address and an online shop address of the first contact; obtaining, from a network service, a first content corresponding to the web log address and the online shop address of the first contact; and displaying the first content on a first area of the display, the first content being dynamically updated.

In at least some embodiments of the present invention, the obtained service information may be displayed on an area of the display of the wireless terminal so that the user can easily and quickly read the information about the concerned contact on the display.

DETAILED DESCRIPTION OF ILLUSTRATIVE EMBODIMENTS

Embodiments of the present invention are hereinafter described in detail with reference to the accompanying drawings. It is evident that the embodiments are only exemplary embodiments of the present invention and the present invention is not limited to such embodiments. Other embodiments that those skilled in the art could obtain based on the disclosed embodiments of the present invention also fall within the protected scope of the present invention.

Figure 1:
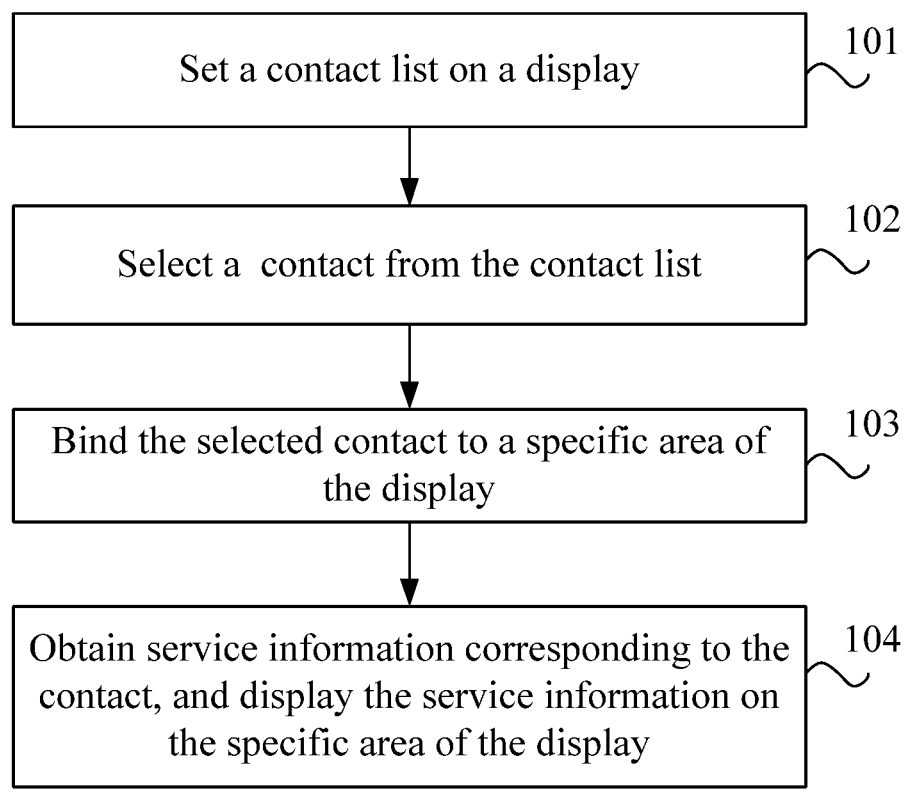
FIG. 1 is a flowchart of a method for processing contact information according an embodiment of to the present invention.

FIG. 1 is a flowchart of a method for processing contact information according to an embodiment of the present invention. As shown in FIG. 1, the method includes the following steps.

Step 101: Set a contact list on a display. For example, a wireless terminal user may set the contact list on the display of the wireless terminal according to actual needs, so that it is convenient to perform related operations on the contacts in the contact list.

Step 102: Select a contact from the contact list. When the wireless terminal user wants to bind one or more contacts to a specific area of the display on the wireless terminal, the wireless terminal user may select the contact from the contact list.

Step 103: Bind the selected contact to a specific area of the display. For example, the wireless terminal may bind the selected contact to the specific area of the display on the wireless terminal, so that different service information corresponding to the contact may be displayed on the specific area of the display. In this embodiment, the wireless terminal may be a cell phone, and the contact is not limited to the information such as the mobile communication number of the contact and may include all information about the contact. In actual applications, the cell phone user may select a contact as a concerned contact, and then bind the contact to the specific area of the display. In this way, all information about the contact is displayed on the specific area of the display.

It should be noted that, this embodiment is not limited to the case that only one contact is bound to one specific area of the display. According to actual needs, multiple contacts may also be bound to multiple specific areas of the display on a one-to-one basis, or multiple contacts may be bound to one specific area of the display. The size and arrangement of the specific area of the display may be determined according to actual needs.

Step 104: Obtain service information corresponding to the selected contact, and display the service information on the specific area of the display. After the wireless terminal binds the selected contact to the specific area of the display, the wireless terminal may obtain service information corresponding to the contact. In this embodiment, a cell phone may be used to obtain and store the service information about the contact stored on the cell phone. For example, the contact may be a mobile communication number of the contact, and service information about the contact may be SMS information or MMS information. The cell phone may receive a piece of SMS information, and then compare or match the sender information carried in the SMS information (for example, the mobile communication number of the sender) with the contact bound to the specific area of the display. If the comparison or matching succeeds, the cell phone can know that the received SMS information is sent from a concerned contact of the user. Thus, the cell phone can display the SMS information on the specific area of the display bound to the contact.

It is understood that the cell phone may also receive a piece of MMS information and display pictures or animations in the MMS information on the bound specific area of the display. In another example, the contact may be an MSN number. Thus, the cell phone may automatically search the background for dynamically updated information such as the personalized signature and image corresponding to the MSN number on a timed basis, for example, every half an hour.

By using the method provided in this embodiment, contact is set on the display to form a contact list; contact is selected from the contact list and bound to a specific area of a display, so that different information about the contact can be displayed on the specific area of the display; the wireless terminal obtains service information corresponding to the contact, so that the user can obtain information about the concerned contact in time by using the wireless terminal; the obtained service information is displayed on the specific area of the display, so that the user can easily and quickly read the information about the concerned contact on the specific area of the display on the wireless terminal.

In another embodiment of the method for processing contact information, the contact includes at least one contact. That is, at least one contact is bound to the specific area of the display. All the service information about the contacts bound to the contact may be displayed on the specific area of the display.

In another embodiment of the method for processing contact information, the contact includes a mobile communication number of the contact and at least one of an instant communication number, a web log address, an Email address, and an online shop address corresponding to the mobile communication number of the contact.

When the contact includes the mobile communication number, the step of obtaining service information corresponding to the contact and displaying the service information on the specific area of the display may include receiving a piece of SMS information or a piece of MMS information; matching the mobile terminal identifier of the sender carried in the SMS information or the MMS information with the mobile communication number. The SMS information or the MMS information can be displayed on the specific area of the display if the matching succeeds.

When the contact includes the Email address of the contact, the step of obtaining the service information corresponding to the contact and displaying the service information on the specific area of the display may include receiving a piece of Email information; matching the Email identifier of the sender carried in the Email information with the Email address information. The Email information can be displayed on the specific area of the display if the matching succeeds.

When the contact includes the instant communication number, the web log address, and the online shop address, the step of obtaining the service information corresponding to the contact and displaying the service information on the specific area of the display may include obtaining the dynamically updated information corresponding to the instant communication number, the web log address, and the online shop address. The dynamically updated information can be displayed on the specific area of the display.

Further, obtaining the dynamically updated information corresponding to the instant communication number, the web log address, and the online shop address may include logging in to a website corresponding to the instant communication number, the web log address, and the online shop address periodically. The dynamically updated information corresponding to the instant communication number, the web log address, and the online shop address can then be obtained.

The following describes the method for processing contact information in detail with reference to specific embodiments.

Figure 2:
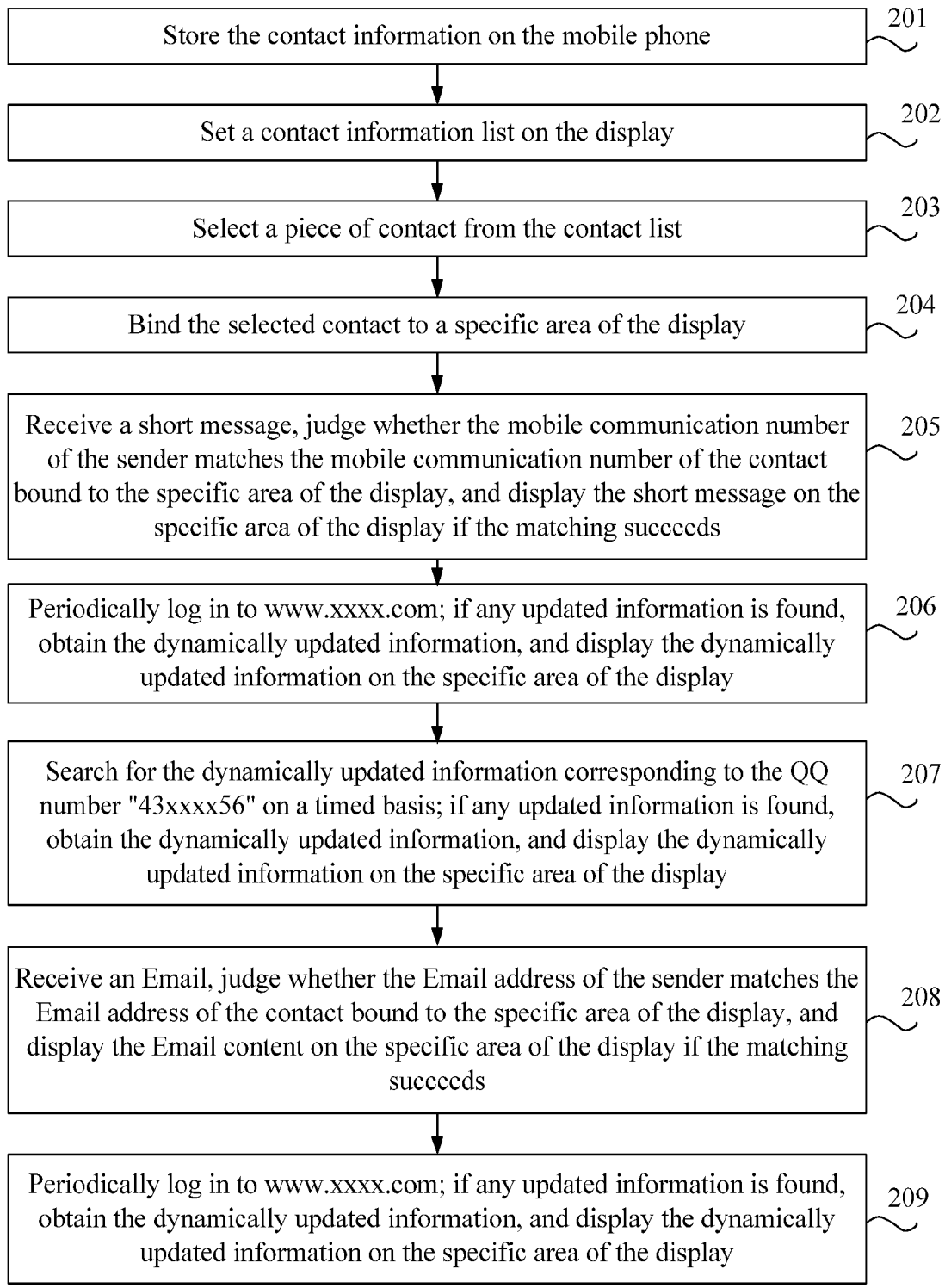
FIG. 2 is a flowchart of the method for processing contact information according to another embodiment of the present invention.

FIG. 2 is a flowchart of a method for processing contact information according to another embodiment of the present invention. In this embodiment, the wireless terminal may be a cell phone, and the contact may be stored on the cell phone. As shown in FIG. 2, the method includes the following steps:

Step 201: Store the contact on the cell phone. The contact is not limited to the cell phone number and may include all the information about the contact. In this embodiment, it is assumed that the following contact is stored on the cell phone: Name: John Smith; mobile communication number: 1212xxx9458; web log address: www.xxxx.com; QQ number: 43xxxx56; Email address: xxxx@sohu.com; online shop address: www.*****.com.

Step 202: Set a contact list on the display. The cell phone user may set the contact of concerned contacts in the contact stored on the cell phone on the display of the cell phone to form a contact list. In this way, when it is necessary to bind the contact to the specific area of the display, the contact may be easily and quickly selected.

Step 203: Select a contact from the contact list.

Step 204: Bind the selected contact to the specific area of the display. For example, the cell phone user may regard John Smith as a concerned contact, and then bind the contact to the specific area of the display, so that all the information about the contact is displayed on the specific area of the display, for example, whether the web log of John Smith is updated, whether short messages are received from John Smith, whether the QQ signature of John Smith is updated, or whether the image of John Smith is updated.

Step 205: Receive a short message, judge whether the mobile communication number of the sender matches the mobile communication number of the contact bound to the specific area of the display, and display the short message on the specific area of the display if the matching succeeds.

When the cell phone receives a short message, the cell phone extracts the mobile communication number of the sender sending the short message, and matches the mobile communication number of the sender with the mobile communication number 1212xxx9458 of John Smith; if the matching succeeds, the cell phone can know that the short message is sent from a concerned contact of the user, and then display the content of the short message on the specific area of the display bound to John Smith.

In step 205, a multimedia message may also be received. When the cell phone receives a multimedia message, the cell phone matches the mobile communication number of the sender sending the multimedia message with the mobile communication number of the contact bound to the specific area of the display; if the matching succeeds, the cell phone can know that the multimedia message is sent from a concerned contact of the user, and then display the content of the multimedia message such as pictures and animations on the specific area of the display bound to John Smith.

Step 206: Periodically log in to www.xxxx.com. If any updated information is found, obtain the dynamically updated information, and display the dynamically updated information on the specific area of the display.

For example, the cell phone logs in to www.xxxx.com on the background every half an hour to know whether the Blog of John Smith is updated. If the Blog is updated, the cell phone may obtain the dynamically updated information, and display the dynamically updated information on the specific area of the display bound to John Smith. Thus, the user may obtain the updated Blog content of John Smith on the specific area of the display.

Step 207: Search for the dynamically updated information corresponding to the QQ number "43xxxx56" on a timed basis. If any updated information is found, obtain the dynamically updated information, and display the dynamically updated information on the specific area of the display.

For example, the cell phone searches every half an hour the background for information about whether the QQ number is updated, for example, whether the personalized signature is updated, whether new logs or new photos are updated on the QQ zone, and whether the QQ image is updated; if any updated information is found, the cell phone obtains the dynamically updated information, and displays the dynamically updated information on the specific area of the display bound to John Smith.

Step 208: Receive an Email, judge whether the Email address of the sender matches the Email address of the contact bound to the specific area of the display, and display the Email content on the specific area of the display if the matching succeeds.

For example, the cell phone may extract the Email address of the sender sending the Email from the Email, and then match the Email address of the sender with the Email address xxxx@sohu.com of John Smith. If the matching succeeds, the cell phone may know that the Email is sent from a concerned contact of the user, and then display the Email content on the specific area of the display bound to John Smith.

Step 209: Periodically log in to www.***.com. If any updated information is found, obtain the dynamically updated information, and display the dynamically updated information on the specific area of the display. For example, the cell phone logs in to www.***.com on the background every half an hour to check whether new commodities are available on the online shop, whether any discount information is available, or whether new comments are added. If any updated information is found, the cell phone may obtain the dynamically updated information, and display the dynamically updated information on the specific area of the display bound to John Smith. Thus, the user may obtain the updated information about the online shop of John Smith on the specific area of the display.

It should be noted that the preceding step 205 to step 209 may be executed in any sequence.

By using the method provided in this embodiment, the contact is set on the display to form a contact list. A contact is selected from the contact list and bound to the specific area of the display, so that different information about the contact can be displayed on the specific area of the display. The wireless terminal actively obtains service information corresponding to the contact, so that the user can obtain information about the concerned contact in time by using the wireless terminal, for example, whether a short message is received from the contact, whether the Blog of the contact is updated, and whether new commodities are available on the online shop of the contact. The obtained service information is displayed on the specific area of the display, so that the user can easily and quickly read the information about the concerned contact on the specific area of the display on the wireless terminal.

Figure 3:
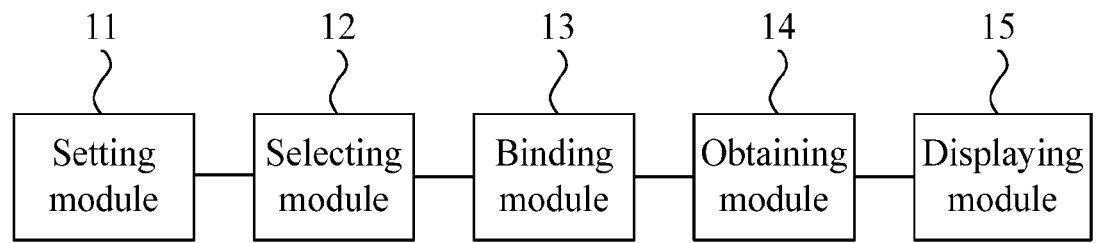
FIG. 3 shows a structure of a wireless terminal according to an embodiment of the present invention.

FIG. 3 shows a structure of a wireless terminal according to an embodiment of the present invention. As shown in FIG. 3, the wireless terminal includes a setting module 11, a selecting module 12, a binding module 13, an obtaining module 14, and a displaying module 15. The setting module 11 is configured to set a contact list on a display. The selecting module 12 is configured to select a contact from the contact list set by the setting module 11. The binding module 13 is configured to bind the contact selected by the selecting module 12 to the specific area of the display. The obtaining module 14 is configured to obtain service information corresponding to the selected contact bound to the binding module 13. The displaying module 15 is configured to display the service information obtained by the obtaining module 14 on the specific area of the display.

The principle for implementing the wireless terminal provided in this embodiment is the same as that for implementing the method for processing contact information shown in FIG. 1, and is not further described.

By using the wireless terminal in this embodiment, the contact is set on the display to form a contact list. A contact is selected from the contact list and bound to a specific area of the display, so that different information about the contact can be displayed on the specific area of the display. The obtaining module actively obtains the service information corresponding to the selected contact, so that the user can obtain information about the concerned contact in time by using the wireless terminal. The obtained service information is displayed on the specific area of the display, so that the user can easily and quickly read the information about the concerned contact on the specific area of the display by using the displaying module.

Figure 4:
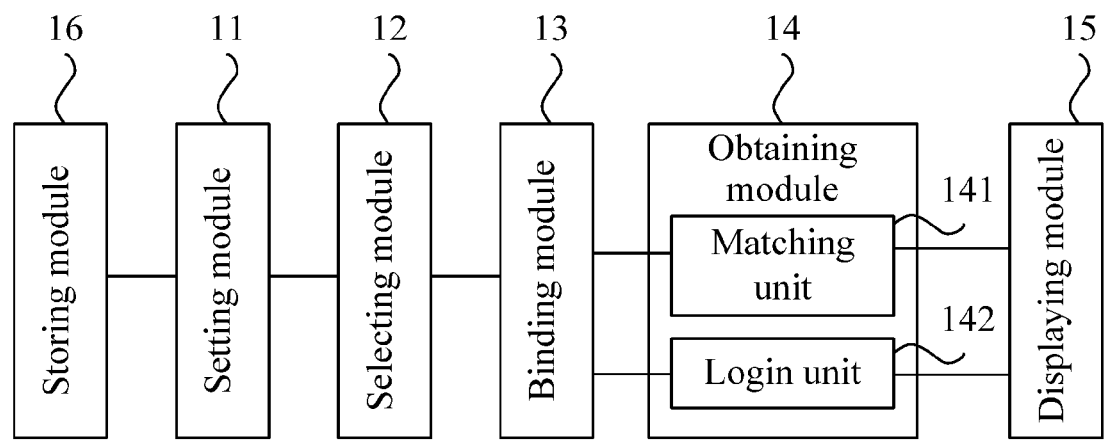
FIG. 4 shows a structure of the wireless terminal according to another embodiment of the present invention.

FIG. 4 shows a structure of the wireless terminal according to another embodiment of the present invention. As shown in FIG. 4, the wireless terminal includes a setting module 11, a selecting module 12, a binding module 13, an obtaining module 14, and a displaying module 15. The setting module 11 is configured to set a contact list on the display. The selecting module 12 is configured to select a contact from the contact list set by the setting module 11. The binding module 13 is configured to bind the contact selected by the selecting module 12 to the specific area of the display. The obtaining module 14 is configured to obtain service information corresponding to the selected contact bound to the binding module 13. The displaying module 15 is configured to display the service information obtained by the obtaining module 14 on the specific area of the display.

Further, the wireless terminal provided in this embodiment includes a storing module 16 configured to store the contact, where the contact includes a mobile communication number and at least one of an instant communication number, a web log address, an Email address, and an online shop address corresponding to the mobile communication number. The obtaining module 14 may include a matching unit 141 and a login unit 142. The matching unit 141 is configured to: match the wireless terminal identifier of the sender carried in received SMS information or MMS information with the mobile communication number of the contact, and send the SMS information or the MMS information to the displaying module 15 if the matching succeeds, or match the Email identifier of the sender carried in received Email information with the Email address, and send the Email information to the displaying module 15 if the matching succeeds. The login unit 142 is configured to log in to a website corresponding to the instant communication number, the web log address, and the online shop address periodically, obtain the dynamically updated information corresponding to the instant communication number, web log address, and online shop address, and send the dynamically updated information to the displaying module 15.

The principle for implementing the wireless terminal provided in this embodiment is the same as that for implementing the method for processing contact information shown in FIG. 2, and is not further described.

By using the wireless terminal provided in this embodiment, the contact stored in the storing module is set on the display to form a contact list; a contact is selected from the contact list and bound to the specific area of the display, so that different information about the contact can be displayed on the specific area of the display by using the displaying module; the obtaining module actively obtains the service information corresponding to the contact, so that the user can obtain information about the concerned contact in time by using the wireless terminal, for example, whether a short message is received from the contact, whether the Blog of the contact is updated, and whether new commodities are available on the online shop of the contact; the obtained service information is displayed on the specific area of the display, so that the user can easily and quickly read the information about the concerned contact on the specific area of the display on the wireless terminal.

Although the present invention has been described through some exemplary embodiments, the invention is not limited to such embodiments. It would be apparent that those skilled in the art can make various modifications and variations to the invention without departing from the spirit and scope of the invention.

What is claimed is:

1. A cellphone, comprising:
a display;
one or more processors; and
a memory storing programming for execution by the one or more processors, the programming including instructions for:
displaying a list of contacts on the display;
determining a first contact from the list of contacts in response to a selection by a user;
binding the first contact to a first specific area of the display, the first contact including an image, an instant communication number, or an Email address;
determining a second contact from the list of contacts in response to another selection by the user;
binding the second contact to a second specific area of the display, the second contact including an image, an instant communication number, or an Email address;
obtaining, from a network service, a first content corresponding to the first contact;
obtaining, from the network service, a second content corresponding to the second contact;
displaying the first content on the first specific area of the display; and
displaying the second content on the second specific area of the display, wherein the first specific area of the display is different from the second specific area of the display, and the first content and the second content are dynamically updated.

2. The cellphone of claim 1, wherein the first specific area of the display is designated for the first contact, and the second specific area of the display is designated for the second contact.

3. The cellphone of claim 1, further comprising:
logging into a location of the network service in accordance with the first contact for obtaining the first content corresponding to the first contact; and logging into a location of the network service in accordance with the second contact for obtaining the second content corresponding to the second contact.

4. The cellphone of claim 1, wherein a size and arrangement of the first specific area of the display is configured by the user.

5. The cellphone of claim 4, wherein a size and arrangement of the second specific area of the display is configured by the user.

6. The cellphone of claim 1, wherein a size and arrangement of the first specific area is determined according to a size of the first content corresponding to the first contact.

7. The cellphone of claim 6, wherein a size and arrangement of the second specific area is determined according to a size of the second content corresponding to the second contact.

8. The cellphone of claim 1, wherein the first content comprises dynamically updated information corresponding to the first contact.

9. The cellphone of claim 8, wherein the second content corresponding to the second contact comprises dynamically updated information corresponding to the second contact.

10. A method for processing contact information performed by a cellphone, the method comprising:
    displaying a list of contacts on a display of the cellphone;
    determining a first contact from the list of contacts in response to a selection by a user;
    binding the first contact to a first specific area of the display, the first contact including an image, an instant communication number, or an Email address;
    determining a second contact from the list of contacts in response to another selection by the user;
    binding the second contact to a second specific area of the display, the second contact including an image, an instant communication number, or an Email address;
    obtaining, from a network service, a first content corresponding to the first contact;
    obtaining, from the network service, a second content corresponding to the second contact;
    displaying the first content on the first specific area of the display and displaying the second content on the second specific area of the display, wherein the first specific area of the display is different from the second specific area of the display, and the first content and the second content are dynamically updated.

11. The method of claim 10, wherein the first specific area of the display is designated for the first contact, and the second specific area of the display is designated for the second contact.

12. The method of claim 10, further comprising:
    logging into a location of the network service in accordance with the first contact for obtaining the first content corresponding to the first contact; and
    logging into a location of the network service in accordance with the second contact for obtaining the second content corresponding to the second contact.

13. The method of claim 10, wherein a size and arrangement of the first specific area is determined according to a size of the first content corresponding to the first contact.

14. The method of claim 10, wherein a size and arrangement of the second specific area is determined according to a size of the second content corresponding to the second contact.

15. The method of claim 10, wherein the first content comprises dynamically updated information corresponding to the first contact.

16. The method of claim 10, wherein the second content comprises dynamically updated information corresponding to the second contact.

17. A non-transitory computer-readable storage medium storing one or more programs, the one or more programs including instructions, which, when executed by a cellphone with a display, a touch-sensitive surface, and one or more processors, cause the cellphone to:
    display a list of contacts on the display;
    determine a first contact from the list of contacts in response to a selection by a user;
    binding the first contact to a first specific area of the display, the first contact including an image, an instant communication number, or an Email address;
    determining a second contact from the list of contacts in response to another selection by the user;
    binding the second contact to a second specific area of the display, the second contact including an image, an instant communication number, or an Email address;
    obtaining, from a network service, a first content corresponding to the first contact;
    obtaining, from the network service, a second content corresponding to the second contact;
    displaying the first content on the first specific area of the display; and
    displaying the second content on the second specific area of the display, wherein the first specific area of the display is different from the second specific area of the display, and the first content and the second content are dynamically updated.

18. The non-transitory computer-readable storage medium of claim 17, wherein the first specific area of the display is designated for the first contact, and the second specific area of the display is designated for the second contact.

19. The non-transitory computer-readable storage medium of claim 17, the instructions further causing the cellphone to:
    log into a location of the network service in accordance with the first contact for obtaining the first content corresponding to the first contact; and
    log into a location of the network service in accordance with the second contact for obtaining the second content corresponding to the second contact.

20. The non-transitory computer-readable storage medium of claim 17, wherein a size and arrangement of the first specific area is determined according to a size of the first content corresponding to the first contact.

21. The non-transitory computer-readable storage medium of claim 17, wherein a size and arrangement of the second specific area is determined according to a size of the second content corresponding to the second contact.

22. The non-transitory computer-readable storage medium of claim 17, wherein the first content comprises dynamically updated information corresponding to the first contact.

23. The non-transitory computer-readable storage medium of claim 17, wherein the second content comprises dynamically updated information corresponding to the second contact.

* * * * *

UNITED STATES PATENT AND TRADEMARK OFFICE
CERTIFICATE OF CORRECTION

PATENT NO. : 9,942,383 B2
APPLICATION NO. : 15/599586
DATED : April 10, 2018
INVENTOR(S) : Junjie Deng Page 1 of 1

It is certified that error appears in the above-identified patent and that said Letters Patent is hereby corrected as shown below:

On the Title Page
(30): delete "01664770"; insert --0166470--

Signed and Sealed this
Fifteenth Day of May, 2018

Andrei Iancu
*Director of the United States Patent and Trademark Office*